Nov. 15, 1932.    D. G. STAFFORD    1,887,963
NUT FOR VALVE STEMS
Filed Nov. 19, 1930

Inventor
David G. Stafford
by J. Edw. Maybee
ATTY.

Patented Nov. 15, 1932

1,887,963

UNITED STATES PATENT OFFICE

DAVID G. STAFFORD, OF VANCOUVER ISLAND, BRITISH COLUMBIA, CANADA

NUT FOR VALVE STEMS

Application filed November 19, 1930, Serial No. 496,653, and in Canada November 15, 1930.

This invention relates to nuts used on the valve stems of pneumatic tires to hold the stem stationary and also to support a dust cap. Usually these nuts are threaded on to the threaded exterior of the valve stem. As the valve stem is of considerable length it takes considerable time to remove the nut, and the object of my present invention is to devise a nut construction which may be readily removed without the necessity of going through this long unscrewing operation.

I attain my object by constructing the nut of two halves hingedly connected at one side. To retain the nut in place until the dust cap is off, a ring is slid over the threaded portion of the nut, this ring being provided with a series of spring fingers, and a resilient band is placed around these fingers to cause the latter to hold the parts of the nut in tight engagement with one another.

Figure 1:
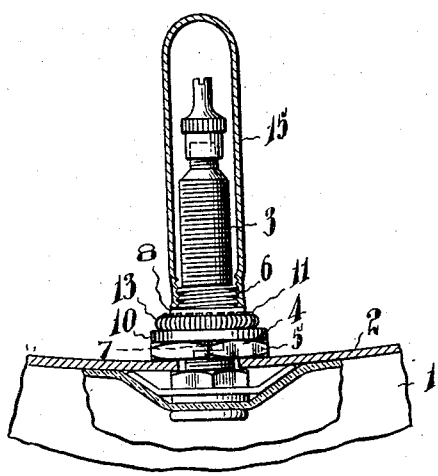
Figure 2:
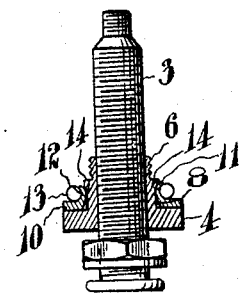
Figure 3:
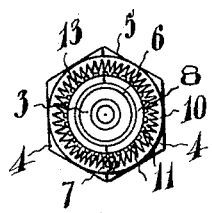

The construction is hereinafter more specifically described and illustrated in the accompanying drawing in which Fig. 1 is a longitudinal section through part of a rim showing my improved device;

Fig. 2 an elevational view of the valve stem, the nut and securing ring being shown in section;

Fig. 3 a plan view of the device; and

Figure 4:
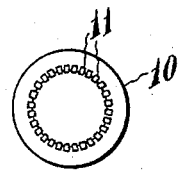

Fig. 4 a plan view of the locking ring.

Figure 5:
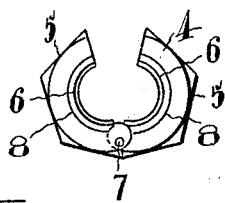

Fig. 5 a plan view of the hinged nut member in open position.

In the drawing, like numenals indicate corresponding parts in the different figures.

1 indicates a wheel felloe, 2 a rim, and 3 a valve stem extending therethrough. 4 is a locking nut which is adapted to bear against the inside of the felloe to lock the stem in position. This nut, as usual, is provided with a hexagonal or other shaped portion 5 and a smaller threaded portion 6 on to which a dust cap 15 is screwed. The nut is divided longitudinally into two halves, which are hingedly connected together at 7. The nut, between the parts 5 and 6 is preferably provided with an unthreaded portion 8, on to which is adapted to be slid a locking ring 10. To facilitate the positioning of this ring, I preferably make it a loose fit, and to secure the necessary pressure to hold the nut sections in closed position while the dust cap is being replaced or removed, I provide the ring with a series of spring fingers 11, the spring fingers being shaped to form an annular groove 12 in which is received a resilient band 13 which is adapted to exert sufficient pressure to cause the spring fingers to bear against the parts of the nut. Preferably the unthreaded portion 8 of the nut is formed with a groove 14 into which the backs of the spring fingers 11 project under the pressure of the band 13.

To remove the device, the dust cap 14 is first unscrewed. The ring 10 is then pulled off, the resiliency in the band 13 and fingers 11 permitting this being done without first removing the band 13. The nut 4 may then be opened up and removed. To replace the device, the nut 4 is first closed about the stem, the ring 10 with its resilient band slipped into place, and then the dust cap screwed into place.

What I claim as my invention is:

1. A quick detachable nut comprising a pair of sections, said sections being internally threaded to receive between them a valve stem and also externally threaded at one end to receive a dust cap; and a spring slip ring adapted to be slipped over the nut sections to hold the sections together, said nut being formed with an annular groove below the externally threaded portion into which said spring slip ring is adapted to project.

2. A quick detachable nut comprising a pair of sections, said sections being internally threaded to receive between them a valve stem and also externally threaded at one end to receive a dust cap; a slip ring adapted to be slipped over the nut sections, said ring being formed with a plurality of spring fingers to engage the nut sections to hold the sections together; and a resilient band encircling said fingers.

Signed at Headquarters, Vancouver Island, B. C., this 22d day of October, 1930.

DAVID GIBB STAFFORD.